United States Patent
Miyamae

[15] 3,669,378
[45] June 13, 1972

[54] FISHING REEL WITH MANUAL OR MOTOR DRIVE

[72] Inventor: Toshiaki Miyamae, 292 Nishi-Iwata, Higashi-Osaka, Japan

[22] Filed: Oct. 2, 1970

[21] Appl. No.: 77,550

[30] Foreign Application Priority Data

Aug. 12, 1970 Japan ................................. 45/80884
Aug. 17, 1970 Japan ................................. 45/71922

[52] U.S. Cl. ......................... 242/84.1 A, 242/215, 242/216
[51] Int. Cl. ........................................................ A01k 89/02
[58] Field of Search ................. 242/84.1 A, 215, 217, 219, 242/84.51 R, 84.5 R; 43/21

[56] References Cited

UNITED STATES PATENTS

| | | |
|---|---|---|
| 2,760,736 | 9/1956 | Mihalko et al. ................. 242/84.5 R |
| 3,116,892 | 1/1964 | Pickard ........................... 242/84.1 A |
| 3,215,359 | 11/1965 | Sanders ............................ 242/84.1 A |
| 3,481,555 | 12/1969 | Miyamae ......................... 242/84.1 A X |

Primary Examiner—Billy S. Taylor
Attorney—Ernest G. Montague

[57] ABSTRACT

In a power driven fishing reel construction, a power unit includes a torque motor; a power transmission unit is adapted to be associated with a speed change actuating unit; the speed change actuating unit comprises a cylindrical cam means and an actuating plate interposed between spring members; the control of the reeling-in speed is effected by selective engagement of a pair of dog clutch means; and detachable spool means can be changed over to be independently operable either by disconnecting further clutch means out of engagement, or by displacing a speed change lever into neutral position.

17 Claims, 8 Drawing Figures

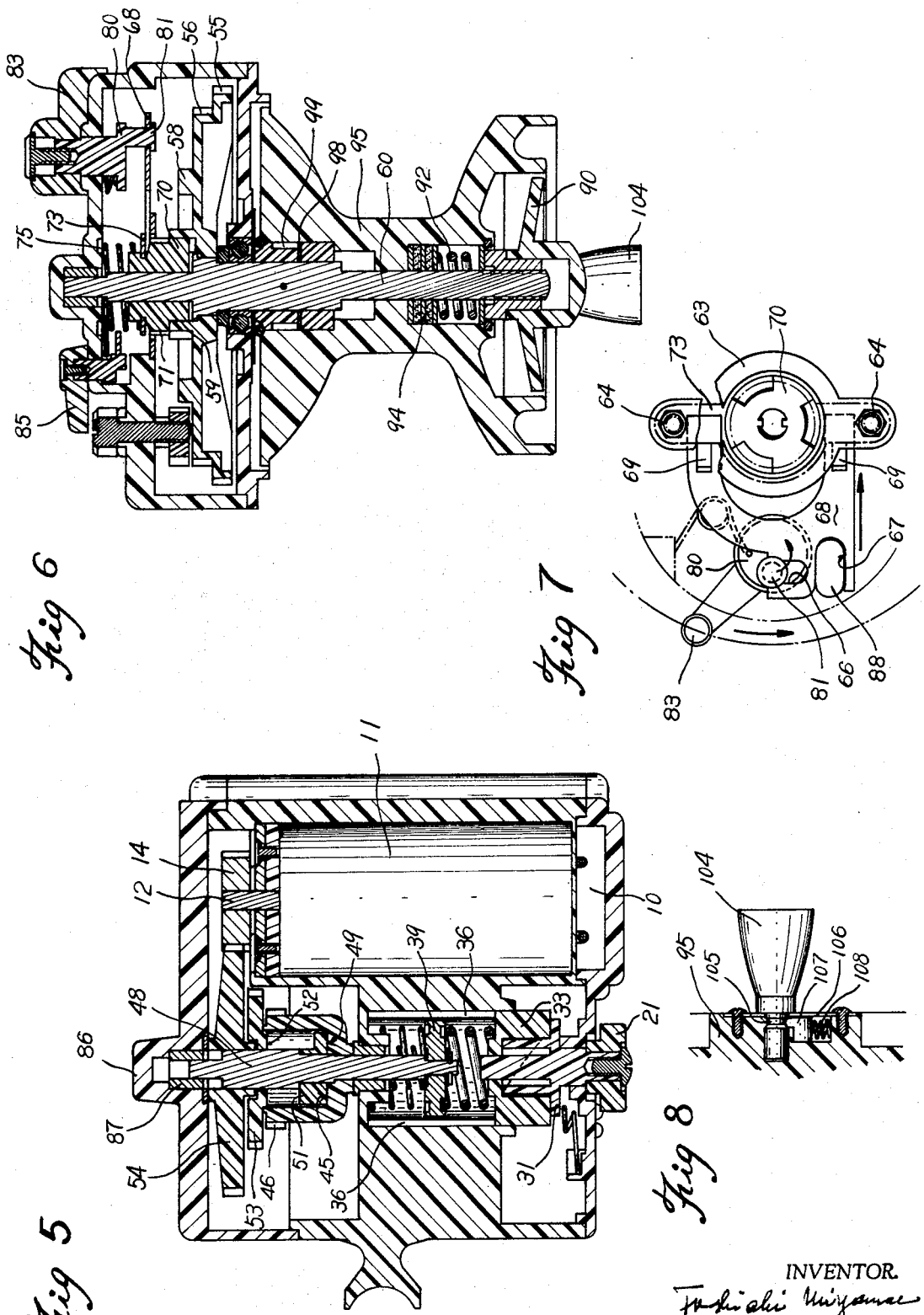

FISHING REEL WITH MANUAL OR MOTOR DRIVE

The present invention relates to fishing reels and more particularly to an improved motorized fishing reel mechanism including a power transmission unit to be associated with a speed change actuating unit.

It is one object of the present invention to provide an improved two-step speed type of power driven fishing reel, which permits easy speed change, even when a motor is energized, and facilitates a powerful reeling-in at a low speed.

Several different types of power-driven or motor-driven fishing reels are known, which have means for controlling and governing the reeling-in speed. However, such known fishing reels require normally either an electric transformer or a transmission gear assembly, in order to change the reeling-in speed, wherein the former has such a deficiency that it is not always applicable to angling for game fish, since the reeling-in speed control is effected by transforming voltage and as a result, reduction in the speed is followed by inevitable decrease in the reeling-in power, in spite of the fact that a more powerful reeling-in at a lower speed is required, when a big game has been hooked on the line; while the latter has such a defect that it is not always easy to have a driving gear smoothly meshed with a selected driven gear, in order to effect a desired speed change, and sometimes a consequential breakage accident will occur, when an attempt is made to force these gears to be meshed with each other.

It is another object of the present invention, to eliminate the drawbacks of the known structures, since the desired speed change can be effected easily and securely merely through selective engagement of a pair of dog clutch means, adapted to transmit the input power mechanically to the output members, while the employed torque motor itself can develop, as well a higher torque at a lower speed when energized.

Furthermore, in the fishing reel, according to the present invention, the spool means can be easily removed for exchange and, when desired, may be changed over to be manually operable, either by swinging the clutch lever for disconnecting the spline clutch element out of the boss portion formed in the double-geared wheel or by moving the speed change lever into the neutral position; and further, the spool means may be allowed to rotate slippingly about the spool shaft merely by loosening an adjusting drag threaded on the outer end of the spool shaft, so that the fishing line may be prevented from breaking off even though being overstrained due to the very strong pull of the hooked game. Other supplementary means in accordance with the present invention as well as the advantages thereof will be disclosed as the specification proceeds.

With these and other objects in view, which will become apparent in the following detailed description, the present invention will be clearly understood in connection with the accompanying drawings, in which:

FIG. 5 is an enlarged section along the lines V—V of FIG. 1;

FIG. 6 is an enlarged section along the lines VI—VI of FIG. 2;

FIG. 7 is an explanatory plan view of the main clutch actuating means, with parts broken away for a better demonstration; and FIG. 8 is a fragmentary elevation, partly in section, disclosing the manner of installing the detachable spool handle.

Figure 1:
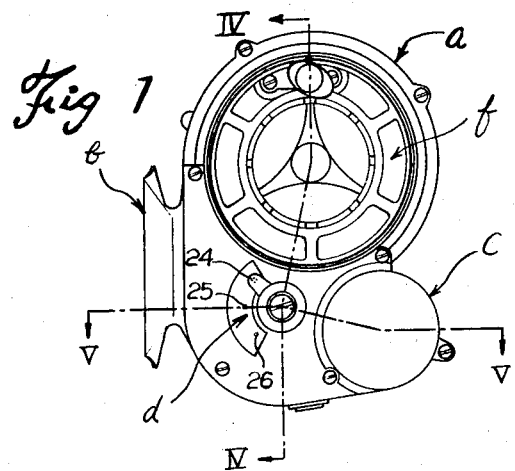
FIG. 1 is a front elevation of the fishing reel construction according to the present invention.
Figure 2:
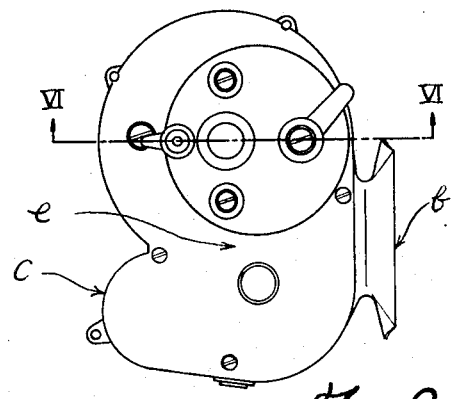
FIG. 2 is a rear elevation of the construction shown in FIG. 1.

Referring now to the drawings, and in particular to FIGS. 1-4, the fishing reel construction, according to the present invention, comprises a housing of suitable configuration generally designated by the reference $a$, a coupling member $b$ to be secured to a fishing rod, a power unit $c$, a speed change actuating unit $d$, a power transmission unit $e$, and a spool unit $f$.

Figure 4:
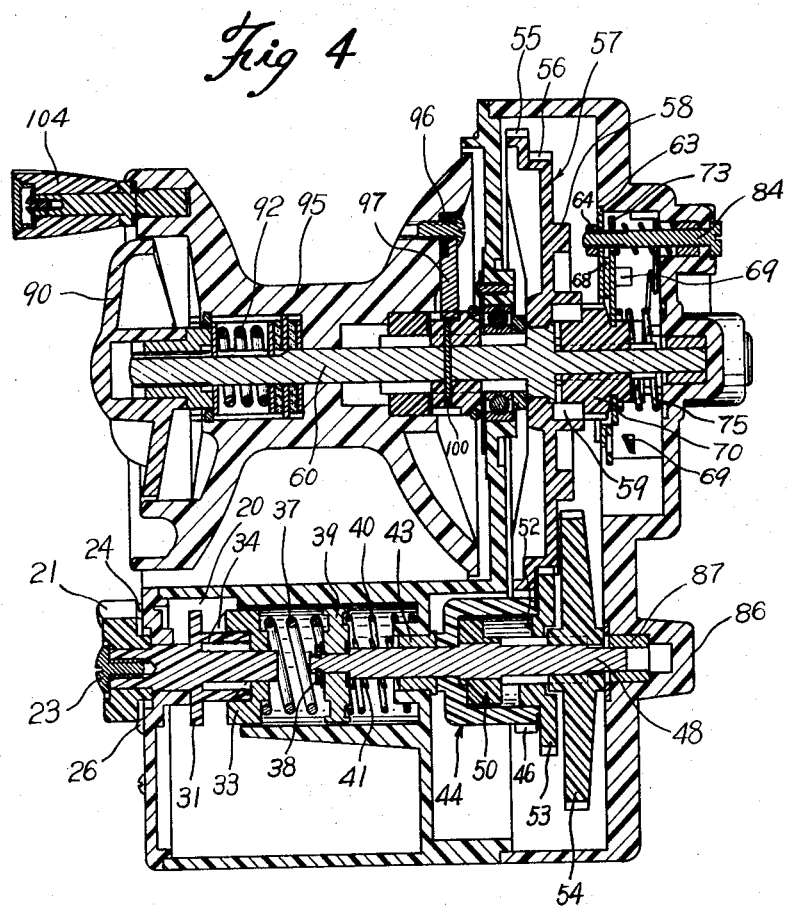
FIG. 4 is an enlarged axial section along the lines IV—IV of FIG. 1.
Figure 3:
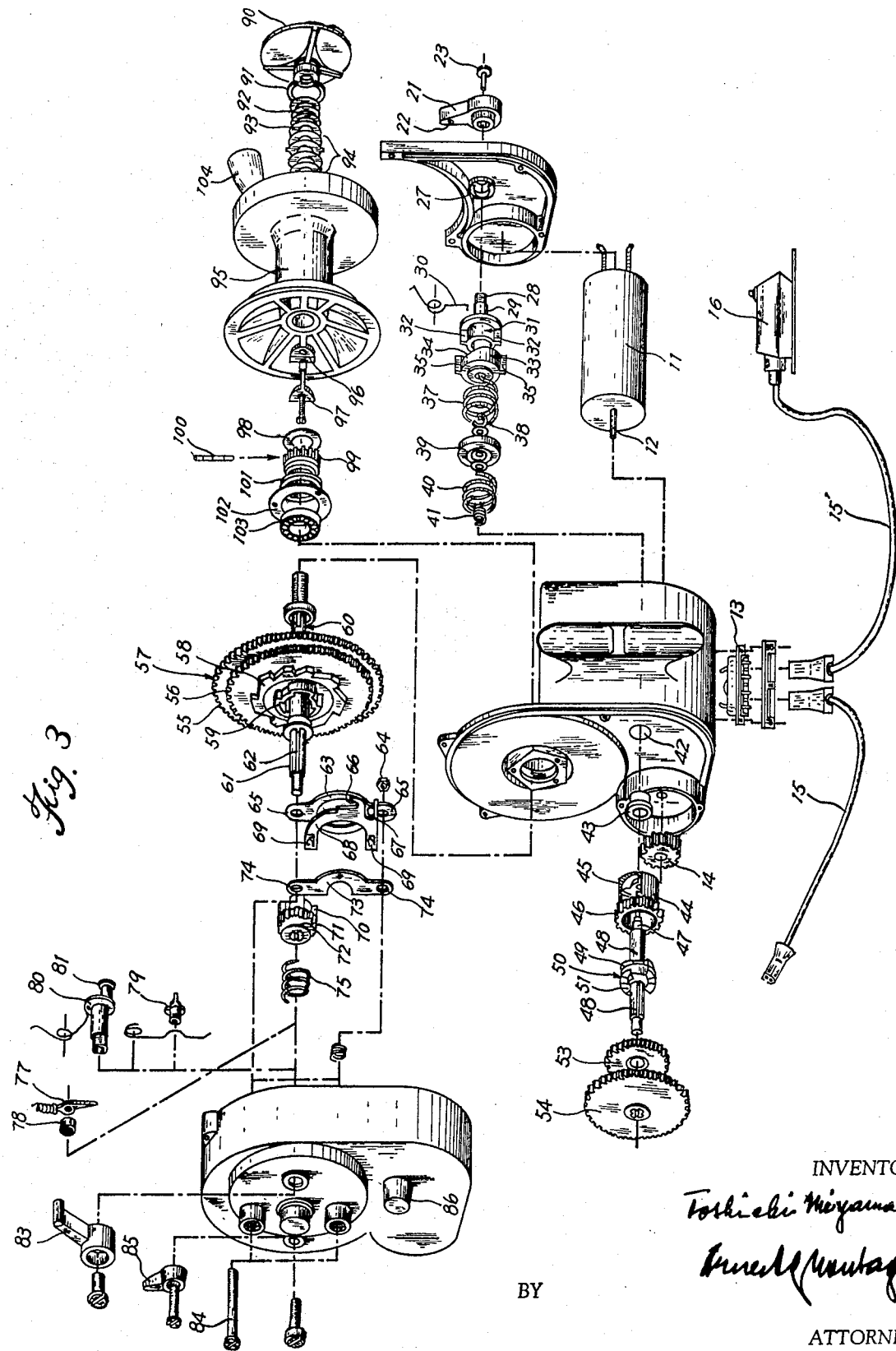
FIG. 3 is an exploded perspective view, showing the reel construction in accordance with the present invention.

As shown particularly in FIGS. 3 and 4, the power unit $c$ includes a suitable compartment 10, a conventional torque motor 11 disposed in the compartment 10 and to be connected to a suitable electric power supply (not shown) by way of flexible cords 15, 15', socket means 13, and a switch 16 (normally open), and an input shaft 12 having mounted at one end thereof a pinion 14, serving as a drive gear to actuate a wheel gear 54.

The speed change actuating unit $d$ comprises a compartment 20 (FIG. 4), a change lever 21, a cam shaft 29 integral with the outer cylindrical cam element (driver) 31 held in place by means of restraining spring 30, cylindrical cam means consisting of a pair of cam elements 31 and 33, at least two axial grooves 36 (FIG. 5) recessed upon the inner peripheral wall of the compartment 20, an actuating plate 39 interposed between a spring member 37 and further cooperating spring members 40, 41 adapted to urge the actuating plate 39 from both sides.

By means of a screw 23, the change lever 21 is secured to the outer end 28 of the cam shaft 29 having its one portion journalled in a sleeve 27 of the compartment wall 20 as well as having its outer end 28 extending outwardly through the sleeve portion 27, so that simultaneous rotation may be imparted to the shaft 29, when the change lever 21 is pivotally moved by hand. On one inward surface of the change lever 21 adjacent to the compartment wall 20 is provided a small concave member 22, which is snappingly engagable with and holds in position any one of three stopper convex members 24 (FIG. 4), 25 (FIG. 1) and 26 (FIG. 4), which are aligned along a line traced by the circular arc movement of the concave member 22 accompanied by the swinging movement of the change lever 21, to keep the same in its "Low speed position 24," "Neutral position 25," or "High speed position 26." While the other cam element (follower) 33, having a spiral cam surface 34, is arranged in the compartment 20, with its slide members 35 slidably received in the axial grooves 36, which will serve as guide means for the slide member 35, whereby the follower cam element 33 is prevented from rotational movement, while allowed to move back and forth in axial direction within the predetermined path.

Thus, in operation, in case the change lever 21 is shifted from the low position (illustrated in FIG. 4) or from the neutral position toward the high speed position, the cam shaft 29 is turned simultaneously imparting a common rotation to the driver cam element 31. As a result, the actuators 32 abutting the spiral cam surface 34 start to revolve pushing the latter forwardly, whereby the follower cam element 33 is forced to move forwardly, compressing the spring member 37, which is adapted to operate an actuating plate 39, when compressed. In response thereto, the actuating plate 39, in turn, is compelled to displace forwardly against the spring members 40 and 41, bringing about an advancing stroke of a clutch shaft 48. Thus, a clutch element 51 goes into positive coupling engagement with a high speed gear 53. In order to reduce the reeling-in speed, the contrary operation is to be taken.

Upon an extension 47 of reduced diameter of the clutch shaft 48 is fixedly mounted the actuating plate 39, which is restrained by a stop ring 38 from endwise motion. About the clutch shaft 48 are provided further spring members 40 and 41 in a manner shown in FIG. 4, so as to present combined repulsion, which is normally stronger than that of the other spring member 37. However, as the spring member 37 is compressed, repulsion thereof becomes stronger than the combined force of the other two springs 40 and 41, and accordingly the actuating plate 39 is urged to move forwardly against the combined spring back force of the spring members 40 and 41, pushing, in turn, the clutch shaft 48 forwardly therewith.

On the other hand, in the power transmission unit $e$, the clutch shaft 48 has the one end thereof journalled for rotation in the projection 86 of the compartment wall, as well as having the other end in one wall 42 of the compartment 20 by means of bearings 43 and 87 (FIG. 4), respectively. A clutch wheel 50 rigidly secured to the clutch shaft 48 is provided with two driver clutch elements 49 and 51 integrally formed on either side thereof. Freely rotatably upon the clutch shaft 48 is mounted a cylindrically formed low speed gear 44, which is always intermeshing with one geared portion 55 of a double-geared wheel 57. A high speed gear 53 is mounted freely rotatably on the clutch shaft 48, and is always intermeshing with the other geared portion 56 of the double-geared wheel 57. In order to transmit the input power positively and alternately to the low speed gear 44 or the high speed 53, there are provided a pair of dog clutch means, that is, the low speed clutch means consisting of the driver element 49 and the follower element 45 provided inside of the low speed gear 44, and the high speed clutch means consisting of the driver element 51 and the follower element 52 (FIGS. 4 and 5) provided on the opposite side of the high speed gear 53. The gear wheel 54 is mounted on the clutch shaft 48, while being limited from relative rotation therebetween, and allowing the latter to reciprocate therethrough, so that the gear wheel 54 may apply common rotational movement to the clutch shaft 48, when driven by the pinion 14. The double-geared wheel 57 is mounted freely rotatably on the spool shaft 60 carrying the spool means. In order to prevent the double-geared wheel 57 from rotating in the reverse direction, there are located in place anti-reversing rachet means, which comprise a rachet 58, provided on the outer surface of the wheel 57, and a pawl 77 pivotally supported on a small shaft 78 for cooperating with the rachet 58.

For the purpose of delivering the output power intermittently to the spool means, main clutch means are provided, which consist of a spline clutch 70 and a boss portion 59 formed in the double-geared wheel 57. The means for actuating the main clutch comprise three plates 63, 68 and 73 of different shapes, at least one tension spring 75, and cam means connected to a clutch lever 83 in conventional manner.

Of the three plates, either of the inner plate 63 and the outer plate 73 are supported by a pair of common screw bolts 84 (FIG. 4), running through the respective ear portions 65 and 74 of both plates in such manner, that the inner plate 63 is rigidly held in place, with both its ears 65 tightened to the shoulder portions of the compartment wall by means of screw nuts 64, while the outer plate 73 is shiftably mounted in relation to each shank portion of the bolts, with its semicircular portion engaged with a ring groove 72 of the main clutch 70. The intermediate plate 68 shiftably interposed between the two plates 63 and 72 is provided with a pair of small wedge projections 69, as well as two semi-elliptical recesses 66 and 67.

While, as shown particularly in FIG. 7, in one internal surface of the compartment wall, there is provided an inward projection 88 formed to be engagable with the semi-elliptical recess 67 and serving as a guide member to limit the rotary motion of the intermediate plate 68.

Thus, in operation for actuating the main clutch, when the clutch lever 83 is pivotally moved, a cam 81, which is provided on the disc 80 for a simultaneous rotation therewith and is engaged with a further semi-elliptical recess 66, is caused to execute a limited eccentric rotation; thereby, the intermediate plate 68 is about to start a rotary motion. However, since the guide 88 is actually operative to limit the rotary motion and convert the same into a substantially rectilinear motion, the intermediate plate 68 is permitted to move back and forth in response to the operation of the clutch lever 83.

Therefore, in order to disconnect the main clutch, the intermediate plate 68 is moved forth wedging itself in between the other two plates 63 and 73, so that the wedge projections 69 may act and effect the sequential outward shifting movement of the outer plate 73. While, as aforementioned, the semicircular web of the outer plate 73 is engaged in the ring groove 72 of the wheel 71, the clutch 70 is caused to be pulled outwardly as the outer plate 73 is urged outwardly, so that the clutch element 70 may be displaced outwardly along the grooved portion 62 of the shaft 60 and get out of clutching engagement with the boss portion 59 of the double-geared wheel 57.

In order to connect the main clutch, the wedge pieces 69 have only to be taken out from a location between the two plates 63 and 73 by moving the intermediate plate 68 in reverse direction with the clutch lever 83, because at least one spring member 75 is adapted to urge the clutch element 70 back into clutching engagement with the double-geared wheel 57.

Furthermore, in order to indicate a fish bite, signal means are provided which include a click element 79 connected to an external knob 85, and a click wheel 71, which is joined by the clutch 70 and mounted on the reduced portion 61 of the spool shaft 60 in such manner, that the click wheel 71 can be axially slidable with relation to the reduced portion 61, but is prevented from relative rotation therebetween in the conventional fashion as can be seen from the drawings.

In the spool unit f, the spool body 95 is carried by the spool shaft 60 in such manner, that it may be easily removed for exchange by loosening the drag 90 adjustably screwed onto the threaded end of the shaft 60. For delivery of the output torque, the shaft 60 and the spool body 95 are coupled with each other by a variable frictional force exerted by a plurality of friction plates 93, 94 and 98, and one or more compression springs 92. Accordingly, when the drag 90 is tightened to the full extent, the spring 92 and the friction plates 93 and 94 cooperate, to urge the outer side of the spool body 95 inwardly, so that the inner side of the spool may be effectively compressed onto the further friction plate 98, which is joined by the click wheel 99, secured to the enlarged portion of the shaft 60 by means of a pin 100 or other conventional means. Therefore, the friction plate 98 and the clock wheel 99 will serve as a kind of friction clutch means for transmitting the output torque to the spool body 95.

As the drag 90 is loosened, the above frictional force will become weakened, resulting in permitting the relative rotation between the shaft 60 and the spool body 95.

At one inside portion of the spool body 95, there is provided a bracket member 96 for mounting a click element 97, which cooperates with the click wheel 99 for a braking effect, by which the accelerated relative rotation between the shaft 60 and the spool body 95 can be restrained, in case the drag is loosened.

The spool handle 104, to be used in manual operation, is detachably mounted at the outer side of the spool body 95 in the manner as shown particularly in FIG. 8. That is, the handle 104 is held in place by the cooperation of a ring groove 105 formed in the shank portion of the handle 104, a shiftable member 107 having a round nose smoothly engagable with the groove 105, and a resilient member 108, for releasably securing the member 107. Therefore, if a full automatic operation is desired, the handle 104 can be easily pulled out of the base plate 106 which is bolted to the spool wall; and if a manual operation is desired, the reverse operation is required.

Thus, in succession to the aforementioned operation, when the actuating plate 39 is urged forwardly against the combined force of the spring members 40 and 41, causing the clutch shaft 48 to be pushed forwardly, the driver clutch 51 of the clutch wheel 50 is moved into clutching engagement with the follower clutch 52 (FIG. 4) of the high speed gear 53; and vice versa when the plate 39 is urged backwardly. As long as the torque motor 11 is energized, the input power is transmitted to the clutch shaft 48 by means of the gears 14 and 54. Subsequently, in any case, where either the high speed gear 53 or the low speed gear 44 is in coupling engagement with the clutch wheel 50, the input power is delivered so far as to the double-geared wheel 57, because both gears 44 and 53 are always intermeshing with the wheel 57. However, since the double-geared wheel 57 remains freely rotatable relative to the spool shaft 60 until the spline clutch element 70 is connected with the boss portion 59 thereof, the output power will not be delivered as far as the spool means. The more detailed description in due order from the initial operation will be made below.

In practical use, prior to casting the fishing line, the spline clutch 70 must first be freed from coupling engagement with the boss portion 59 of the wheel 57, by the use of the main clutch actuating means, in order that the spool shaft 60 can be freely rotating for paying out the line. In this connection, it may be preferable to keep the click element 79 out of engagement with the click wheel 71 as well; however, in case, for instance, of casting the line leeward in the current of windy air, the element 79 may be set into operative position to prevent the accelerated movement of the spool. After the casting operation is terminated, the fish bite signal means may preferably be set into its active position by operating a knob 85, so as to get the resilient click element 79 to be engaged upon the serration of the click wheel 71, so that the signal means may produce click sounds, when a fish bites and runs causing a rotational movement of the spool 95, as well as of the spool shaft 60. In addition to the primary function thereof, it is to be noted that this signal means may serve as backlash prevention means, as well as brake means for keeping away the accelerated unreeling movement of the spool resulting from, for instance, a quick and sudden running of a hooked fish, whereby a troublesome entanglement of the line can be prevented.

When the automatic operation is desired, it will be required to connect the main clutch by swinging the clutch lever 53, as soon as the signal means start to indicate. From the viewpoint of quick action, it will surely be more preferable to have set the clutch wheel 49 into a coupling engagement alternately with the high speed gear 53 or the low speed gear 44 by selectively operating the change lever 21 in advance of or just after the operation to connect the main clutch. The necessary step to be taken next is to operate the switch means 16, which is located at some accessible position of a rod, timely and suitably. The switch means 16 to be employed is preferably of such type, as is normally opened while closed, as long as a switch button is depressed. When effecting the speed change practically, a fisherman may either release the switch button once to stop energizing the motor 11, or keep depressing the same with his left hand thumb or a finger, while operating the change lever 21 with his right hand.

In retrieving a hooked game automatically, the anti-reversing rachet is always operative, so that the reversion of the spool shaft 60, as well as the spool body 95 mounted thereon can be prevented. However, when the line is overstrained, due to the very strong pull of the hooked game, the spool body 95 can be permitted to rotate in the reverse direction slippingly or skiddingly about the spool shaft 60 by loosening the drag 90, which is adjustably threaded on the outer end of the shaft 60, whereby the fishing line may be prevented from being cut off.

In case of changing over to manual operation, two ways are available; the one is to disconnect the main clutch means by use of the clutch lever 83; and the other, to move the speed change lever 21 into the neutral position. It will be obvious from the foregoing description that, in the second case the anti-reversing rachet means are operative, however, not in the first case. Therefore, the selection is to be made in accordance with the prevailing circumstances.

It should be noted that the present invention, illustrated and described in detail in the drawings and foregoing description, is to be considered as illustrative and restrictive in character, and that all changes and modifications that come within the spirit of the present invention are included.

While I have disclosed one embodiment of the present invention, it is to be understood that this embodiment is given by example only and not in a limiting sense.

I claim:
1. A fishing reel construction comprising
   a housing means,
   a motor means disposed in said housing means,
   a speed change actuating means including a pair of cam members,
   one of said cam members being connected to a speed change lever for simultaneous rotation;
   the other of said cam members having a spiral cam surface and being restrained from rotational movement while permitted to reciprocate,
   a power transmission means including an input shaft adapted to be shifted by said speed change actuating means,
   a pair of clutch means for selective engagement and disengagement alternately with a high speed gear and a low speed gear,
   a double-geared wheel in mesh continuously with said high speed gear and said low speed gear and mounted freely rotatably on an output spool shaft,
   a main clutch means including a pair of clutch members for transmitting the input power to said output spool shaft,
   a main clutch actuating means including three plates actuated by an eccentric cam means, and
   a spool means mounted on said spool shaft in such manner, that it can be easily removed for exchange.

2. The fishing reel construction, as set forth in claim 1, which includes
   a fish bite signalling means having a click element and a click wheel.

3. The fishing reel construction, as set forth in claim 1, which includes
   an anti-reversing rachet means including a pawl member and a rachet member provided on said double-geared wheel of said power transmission means.

4. The fishing reel construction, as set forth in claim 1, wherein
   said motor means comprises a torque motor capable of varying its torque in relationship to the operative load on said output shaft.

5. The fishing reel construction, as set forth in claim 1, wherein
   said speed change actuating means further includes an actuating member interposed between spring members.

6. The fishing reel construction, as set forth in claim 1, which includes
   a snappingly engaging means holding said speed change actuating means in neutral position.

7. The fishing reel construction, as set forth in claim 1, wherein
   said cam members are cylindrical.

8. The fishing reel construction, as set forth in claim 1, wherein
   said one of said cam members has at least one actuator for urging the spiral cam surface of the other of said cam members.

9. The fishing reel construction, as set forth in claim 1, wherein
   said reciprocable cam member has at least one slide piece slidably received in at least one groove formed on said compartment wall.

10. The fishing reel construction, as set forth in claim 1, wherein
    said power transmission means further includes a gear wheel to be driven by a pinion adapted to be connected to a motor shaft, and to transmit its torque to said input shaft.

11. The fishing reel construction, as set forth in claim 1, wherein
    said clutch means for speed change are in the form of a pair of dog clutch means.

12. The fishing reel construction, as set forth in claim 1, wherein
    one of said pairs of clutch means comprises a first clutch element secured on said input shaft and a second clutch element provided on the opposite side of said low speed gear; and
    the other of said pairs comprises a further clutch element secured on said input shaft and a further clutch element provided on the opposite side of said high speed gear.

13. The fishing reel construction, as set forth in claim 1, wherein
both said high speed gear and said low speed gear are mounted freely rotatably on said input shaft, respectively.

14. The fishing reel construction means, as set forth in claim 1, wherein
said main clutch means includes a spline clutch element arranged to be axially shiftable relative to said output shaft and a boss portion formed in said double-geared wheel.

15. The fishing reel construction, as set forth in claim 1, wherein
of said three plates of said main clutch actuating means, said inner plate is rigidly secured on the suitable inner wall of said housing means,
said intermediate plate is adapted to be actuated reciprocatingly by the eccentric cam means for urging said outer plate outwardly by means of its wedgy projections,
said outer plate is engaged with said clutch element of said main clutch means for shifting the same simultaneously into or out of clutching engagement thereof.

16. The fishing reel construction, as set forth in claim 1, wherein
said eccentric cam means of said main clutch actuating means includes a disc member and an actuator provided thereon.

17. The fishing reel construction, as set forth in claim 1, wherein
said spool means are provided with a handle having a ring groove formed thereon for permitting manual detachment.

* * * * *